US008055600B2

(12) United States Patent  (10) Patent No.: US 8,055,600 B2
Dumeur et al.  (45) Date of Patent: Nov. 8, 2011

(54) SYSTEMS AND METHODS FOR APPLYING EVOLUTIONARY SEARCH TO GENERATE ROBUST SEARCH STRATEGIES

(75) Inventors: Renaud Dumeur, Paris (FR); Jean-Francois Puget, Carry-le-Rouet (FR); Paul Shaw, Grasse (FR)

(73) Assignee: International Business Machines Corporation, Armonk, NY (US)

( * ) Notice: Subject to any disclaimer, the term of this patent is extended or adjusted under 35 U.S.C. 154(b) by 1270 days.

(21) Appl. No.: 11/600,529

(22) Filed: Nov. 15, 2006

(65) Prior Publication Data

US 2009/0228414 A1   Sep. 10, 2009

(51) Int. Cl.
*G06N 3/00* (2006.01)
*G06N 7/00* (2006.01)
*G06N 3/12* (2006.01)
(52) U.S. Cl. .......................................... 706/47; 706/19
(58) Field of Classification Search .................. 706/47
See application file for complete search history.

(56) References Cited

OTHER PUBLICATIONS

Fonseca et al., Multiobjective Optimization and Multiple Constraint Handling with Evolutionary Algorithms I: A Unified Formulation, 1995.*
Shibuya et al., Integration of Multi-objective and Interactive Genetic Algorithms and its Application to Animation Design, 1999.*
Stanford Encyclopedia of Philosophy Supplement to Set Theory, 2002.*
Yokota et al., Genetic Algorithm for Non-Linear Mixed Integer Programming Problems and Its Applications, Computers ind. Engng vol. 30, No. 4, pp. 905-917, 1996.*
Bartak "Theory and Practice of Constraint Propagation." pp. 7-14, CPDC 2001.
Rechenberg, Ingo (1973) "Evolution strategy: optimization of technical systems according to the principals of biological evolution", Stuttgart: Fromman-Holzboog.
Schwefel, H.-P. (1977) "Numerische Optimierung von Computer-Modellen mittels der Evolutionsstrategie", Basel: Birkhaeuser.
Schwefel, H.-P. (1987), "Collective Phenomena in Evolutionary Systems," 31st Ann. Mtg. Int'l. Soc. for General System Research, Budapest, pp. 1025-1033.
Schwefel, H.-P. (1994), "Evolution and Optimum Seeking," Dortmund <retrieved from http://1s1 1-www.cs.uni-dortmund.de/lehre/wiley/>.
Goldberg D. E. et al., "Messy Genetic Algorithms : Motivation, Analysis, and First Results," Complex Systems, vol. 3, n 5, pp. 493-530, (1989). (Also TCGA Report 89003).

(Continued)

*Primary Examiner* — Jeffrey A Gaffin
*Assistant Examiner* — Nathan Brown, Jr.
(74) *Attorney, Agent, or Firm* — Steven M. Greenberg, Esq.; Carey, Rodriguez, Greenberg & Paul

(57) ABSTRACT

The present invention relates to methods and systems for applying evolutionary algorithms to generate robust search strategies for problems including decision variables. In one aspect, the invention encodes genomes of at least one triplet comprising a variable, assignment priority, and assigned value. The genome may later be decoded to determine a partial or complete assignment of values to variables. If a partial assignment is reached, a search strategy may be applied to generate a complete or more complete assignment. The genomes may also be evolved to produce offspring genomes.
One type of evolutionary operator, called the Lamarckian operator is introduced, wherein the similarities, differences, and unbound variables resulting from the decoding of two or more parent genomes are collected. These collections are then used to encode an offspring genome, building upon the strengths of the parents.

24 Claims, 4 Drawing Sheets

OTHER PUBLICATIONS

Dumeur, R., "Evolution Through Cooperation: The Symbiotic Algorithm," Lecture Notes in Computer Science, Vol. 1063, Selected Papers from the European conference on Artificial Evolution, pp. 145-158, ISBN:3-540-61108-8, Publisher Springer-Verlag London, UK (1995).

Dumeur et al., "Applying Evolutionary Search to Generate Robust Constraint Programming Search Strategies", Kluwer Academic Publishers, pp. 1-30, (2006).

Baldwin, J. M., "A New Factor in Evolution," American Naturalist 30, pp. 441-451, 536-553, (1896).

Deb, K., et al., "A Fast Elitist Non-Dominated Sorting Genetic Algorithm for Multi-Objective Optimization: NSGAII," in: M. Schoenauer, K. Deb, G. Rudolph, X. Yao, E. Lutton, J. J. Merelo and H.-P Schwefel (eds.): *Proceedings of the Parallel Problem Solving from Nature VI Conference*. Paris, France, pp. 849-858, Springer. Lecture Notes in Computer Science No. 1917, (2000).

Falkenauer, E. et al., "A Genetic Algorithm for Bin Packing and Line Balancing," Proceedings of the IEEE 1992 International Conference on Robotics and Automation, pp. 1186-1192, (1992).

Goldberg, D. E. et al., "Don't Worry, Be Messy," in: R. Belew and L. Booker (eds.): Proceedings of the Fourth International Conference on Genetic Algorithms, San Mateo, CA, pp. 24-30, Morgan Kaufman, (1991).

Heitkoetter, J., "Collection of 48 0/1 Multiple Knapsack Problems," http://people.brunel.ac.uk/mastjjb/jeb/orlib/files/mknap2.txt, 44 pages.

Holland, J. H., "Adaptation in Natural and Artificial Systems," Ann Arbor, MI: University of Michigan Press, (1975).

Walshaw, C. et al., "Multilevel Mesh Partitioning for Heterogeneous Communication Networks," Future Generation Computer Systems,17(5), pp. 601-623 (2001).

Shaw, P, "A Constraint for Bin Packing," in: Proceedings of the 10th Int'l. Conf. on Principles and Practice of Constraint Programming (CP 2004). pp. 648-662, (2004).

Smith, J. and T. C. Fogarty, "Self Adaptation of Mutation Rates in a Steady State Genetic Algorithm," International Conference on Evolutionary Computation, pp. 318-323 (1996). <retrieved from http://www.cems.uwe.ac.uk/~jsmith/ on May 22, 2007>.

Syswerda, G., "A Study of Reproduction in Generational and Steady State Genetic Algorithms," G. J. E. Rawlins (ed.): Foundations of Genetic Algorithms. Morgan Kaufmann Publishers, pp. 94-101, (1991).

Trick, M., "Michael Trick: Operations Research Page," <http://mat.gsia.cmu.edu/COLOR/instances.html> <last viewed 2005>, 3 pages.

Walshaw, C., "The Graph Partitioning Archive:: Colouring Annexe," <http://staffweb.cms.gre.ac.uk/wc06/partition/index-colour.html> <last viewed 2005>, 19 pages.

Schwefel, H. P.: 1965, "Kybernetische Evolution als Strategie der experimentellen Forschung in der Stromungstechnik". Master's thesis, Technical University of Berlin.

* cited by examiner

SYSTEMS AND METHODS FOR APPLYING EVOLUTIONARY SEARCH TO GENERATE ROBUST SEARCH STRATEGIES

CROSS-REFERENCES TO RELATED APPLICATIONS

None

STATEMENT REGARDING FEDERALLY SPONSORED RESEARCH OR DEVELOPMENT

None

INCORPORATION-BY-REFERENCE OF MATERIAL SUBMITTED ON A COMPACT DISC

None

BACKGROUND OF THE INVENTION

Field of the Invention

The present invention relates generally to systems and methods for generating solutions to optimization problems. More particularly, the present invention relates to systems and methods for finding improved solutions to constraint programming (CP) problems and mixed integer problems (MIP) through the use of evolutionary algorithms.

BRIEF SUMMARY OF THE INVENTION

Many scheduling and routing models are too difficult for mathematics. To be more precise, mathematical programming (MP) techniques based on linear algebra (the most common technique for optimization of schedules and plans) break down on most large routing and detailed scheduling problems.

For such situations, an optimization technology called constraint programming (CP), aimed at solving difficult scheduling and routing problems, was developed. Constraint programming is an emergent software technology for declarative description and effective solving of large, particularly combinatorial, problems usually in the areas of planning and scheduling. Although math is used to help find the correct search path among many choices, CP is not fundamentally based on advanced mathematics. CP is based primarily on computer science-logic programming, graph theory and artificial intelligence efforts.

CP's approach to optimization is different from MP. CP finds efficient solutions (feasible combinations of resource assignments and activities with good utilization) in problems with too many individual constraints regarding sequence and timing for MP. CP is useful when dealing with the complexity of many real problems. For example, CP is useful for scheduling people, machines, or process steps; dispatching trucks delivering freight; and dispatching technicians installing cable service, where the operating constraints and business rules are too complex for mathematics.

CP systematically eliminates possible solutions in order to rapidly identify feasible solutions that can be optimized. Thus, CP allows direct modeling of complex problems (e.g., scheduling or routing), where MP requires a linearization of the problem.

As with MP, a CP model is expressed in a declarative fashion, using decision variables, constraints and objectives. CP's methodology of modeling revolves around formalizing a problem description. For example, to schedule a large number of resources and activities that respect capacity limitations, sequencing requirements, synchronization and individual delivery time commitments, CP would generally require steps including: defining activities with information about execution time, sub-activities, resource requirements, alternative resources allowed, precedence requirements, costs, etc.; defining resources that have capacities, costs and capabilities that can be required, consumed or shared by certain activities, and produced by others; balancing sometime conflicting business goals; tracking resource utilization, consumption and available capacity; tracking time to be able to sequence activities and respect time windows when activities must occur; controlling the possible values for each decision variable; and reducing the possible values for a decision variable as other variables are determined.

In this example, three concepts are fundamental to the way constraint programming generates workable schedules from such a model. The first concept is the manner in which CP handles time. MP can divide time into buckets and decide what is optimal for each bucket. However, MP can be less adequate when computing the optimal sequence of large numbers of inter-related activities with a start time for each. CP, for example, can determine the best sequence of activities that satisfy capacity limitations, set-up times, maintenance requirements, availability restrictions, and individual delivery due dates. The second major concept offered by CP is domain reduction. Domain reduction is the internal mechanism that makes difficult scheduling problems manageable (i.e., every resource or activity to be scheduled has a certain number of possible values that can be systematically reduced until a solution is reached). Every domain reduction makes the problem easier. Reducing the size of the search space is a concept found in both MP and CP, but each goes about it differently. CP has fewer limitations than MP on its ability to work with non-linear constraints. The third concept relates to the second: CP incorporates the notion of systematically exploring a decision tree for feasible and efficient solutions. One benefit of this structured approach is the ability to move flexibly throughout the search space and to backtrack when early choices turn out to be dead-ends.

Constraint Programming is used in software sold by ILOG, Inc. of Mountain View, Calif. under the name ILOG Constraint Programming and ILOG CP.

In constraint programming, conflicts (either minimal or non-minimal) are known as "explanations."

In many cases, constraints are used actively to reduce domains by filtering values that cannot take part in any solution. This process is called constraint propagation, domain filtering, pruning, or consistency technique. Constraint propagation may be used to fully solve problems. However, this is rarely done due to efficiency issues. It is more common to combine an efficient albeit incomplete consistency technique with non-deterministic search. This consistency technique does not remove all inconsistent values from the domain of constraint variables. Yet, the technique can eliminate many obvious inconsistencies, thereby simplifying the problem and reducing the search space.

Many theoretical consistency techniques are known, including: node consistency, arc consistency (including AC-1, AC-2, AC-3, AC-4, AC-5, AC-6, and AC-7 algorithms), path consistency, restricted path consistency, k-consistency, (i,j)-consistency, inverse consistency, and singleton consistency. Overviews of these and other techniques are briefly described by Roman Bartak in an article titled, "Theory and Practice of Constraint Propagation."

Evolutionary Algorithms (EAs) are search and optimization methods loosely based on the theory of the natural evolution of species proposed by Charles Darwin.

Such algorithms usually consider solutions as individuals which are stored in a population. As these individuals undergo selection and reproduction processes, their offspring may represent new points of the search space as well as new bases for further improvements. One basic evolutionary algorithm can be described using pseudo-code, as follows:

```
Require: popsize {The desired size of the population}
while actual population size < popsize
    add individual to population
end while
while no satisfying individual has been found do
    select some parents from current population
    reproduce (by mutating or recombining) these
    parents to generate some offspring
    produce a new population by replacing individuals
    of the previous generations with offspring
end while
```

This algorithm may be further understood when viewed in combination with the flowchart set forth in FIG. 1. At step 101, the size of the population of solutions to potentially be evolved is tested. A population of popsize is required. If the population is not the required size, the flow is directed to step 102, where an individual is added to the population. The individual may be randomly generated. Flow then returns to step 101. If it is detected at step 101 that the population is at least as large as popsize, flow proceeds to step 105. In step 105, the individual solutions in the population are tested to determine whether any of them satisfy a particular test. For example, the solutions may be tested for feasibility or against an already known value of an objective function. If one or more solutions satisfy the test, flow is passed to step 125, ending the algorithm. However, if none of the solutions satisfy the test, flow is passed to step 110. In step 110, at least one solution (often called "parent solution(s)" or "parent(s)") is selected from the population of solutions. In step 115, at least one potentially new solution is generated from the selected parent(s), often by mutating or recombining portions of the parent(s). In step 120, the potentially new solution(s) may be used to replace one or more individual solution(s) already in the population. For example, if a new solution is feasible, has a better objective value than its parent, and is not a duplicate of another solution in the pool, the new solution may replace the parent or another solution with a relatively poor objective value. After step 120, flow returns to the step 105.

It will be understood that the algorithm of FIG. 1 is merely one example of an evolutionary algorithms.

Adapting such an evolutionary algorithm to solve constraint programming (CP) problems generally requires providing four additional components. First, a genetic representation which encodes constrained variable assignments is needed. This representation should support modifications performed by mutation, recombination, or other potential evolutionary operators. Second, a decoding mechanism is needed. The decoding mechanism produces a CP solution from the genetic representation stored in the EA individual. Third, at least one recombination, mutation, or other evolutionary operator which produces novel combinations of variable assignments is needed. Fourth, the main execution loop that will drive the population evolution for solving constraint satisfaction and constrained optimization problems is needed. These components are described further below.

A CP may be adapted to evolutionary computation as follows. For example, one manner of considering constrained variables and a simple search method are set forth herein. An integer CP model specifies the following three components. First, a set of $N_v$ constrained variables $X=\{x_1, \ldots, x_{Nv}\}$ is specified. Second, a mapping $D^X$ from variables to the integer sets which represent their domains is specified. The domain of the variable x may be denoted by the integer set $D_x$, wherein $D_x$ is a set containing at least one integer value. Third, a set of constraints which establishes logical or arithmetical relationships between variables is specified.

One method for solving CP problems is known as Depth First Search (DFS). DFS is an algorithm for traversing or searching a tree, tree structure, or graph. In a simple form, DFS begins at the root of a search tree and explores as far along each branch of the search tree as possible before backtracking. DFS is generally considered an uninformed search. When considering DFS in conjunction with the example CP set forth above, each tree node defines a decision about a variable $x \in X$. This decision results in a reversible modification of the variable's domain ($D'_x$) as maintained by the CP solver. One example of a CP solver is software sold by Ilog, Inc. of Mountain View Calif. under the name ILOG CP or ILOG Constraint Programming. Using DFS, a typical search tree node branches as follows. A branch to the left represents x=v which results in a search space region wherein $D'_x=\{v\}$. A branch to the right negates the decision of left branch and represents x≠v, thus delimiting a search space region where $v \notin D'_x$.

It will be understood that search algorithms other than DFS may be used to solve CP problems.

One method of speeding the search process, is to perform constraint propagation on variable domains. To do so, at the beginning of the solve process, a first pass analyzes the model and performs initial constraint propagations based on the modeled variable domains. Then, during search, each variable domain reduction resulting from branching decisions (i.e. when x=v or x≠v occurs) is propagated, via constraints referencing x, to other variables which, in turn, may have their domains also reduced. Although this propagation process may not be complete, it generally speeds up the search process. Logical inconsistencies detected during constraint propagation may be signaled to the solver which may then backtrack (undoing modifications on DI) and continue to explore the remaining portions of the search tree.

Using the ILOG CP software, a simple DFS procedure can be implemented following this pseudo-code for a first fail heuristic:

```
Algorithm FirstFail
Require: X {The set of constrained variables}
Require: D' {The solver's variable domain map}
    U <- {x ∈ X : |D'_x|>1} {The set of unbound
    variables}
    if U ≠ 0 then
        select x ∈ U minimizing |D'_x| {Select variable
        to assign}
        v <- min D'_x {Select assigned value}
        return (x = v ∨ x ≠ v) ∧ (call FirstFail)
        {Recursively explore the search tree}
    end if
```

This algorithm 200 may be further understood when viewed in combination with the flowchart set forth in FIG. 2. At step 201, a set of constrained variables X and the variable domain map D' for the variables in X are input into the algorithm. In step 205, the set of unbound variables U is assigned all variables x from the set X wherein the cardinality (i.e., the number of elements of the set) of $D'_x$ is greater than one. When $D'_x$ equals one, the variable has only one possible value and need not be part of a search tree. In step 210, the size of U is tested. If U is empty, then all variables are bound and further no search is needed. Thus, flow proceeds to step 230. If U is not empty, then flow proceeds to step 215. In step 215, the algorithm selects a variable x from the set U. The variable having the minimum cardinality of $D'_x$ is selected. Where more than one x have equally small cardinality (which is minimal within U), the variable may be randomly (or otherwise) selected from among those having the minimal cardinality. In step 220, the minimum value of $D'_x$ is assigned to v. In step 225, the algorithm recursively calls algorithm 200 twice, the first call having an assignment x=v, and the second call having an assignment x≠v. As mentioned, logical inconsistencies may be sought during this process, allowing backtracking before all variables are assigned a value. In this manner, the algorithm searches each branch of the tree until a value is assigned to each variable in X. Eventually, through recursion, it is hoped that the algorithm will reach step 230, signaling that each variable has at least one possible assignment. It is understood that CP problems may be formulated wherein no feasible solution is possible. In such cases, if logical inconsistencies are sought during processing, the search may fail before all variables are assigned, and step 230 may not be reached.

It will be understood that the algorithm of FIG. 2 is merely one example of a simple DFS algorithm.

Although many problems may be tackled by the described algorithm, solution performance may suffer from biases introduced by at least the following two factors. First, a predefined, although dynamic, instantiation ordering based on variable domain sizes may lead to a longer search. Second, the predefined value selection method which always chooses the lower bound of the variable's domain $D'_x$ may lead to a longer search. For example, depending on the problem structure, early variable assignments may be detected as incorrect in the deepest part of the search tree, resulting in numerous backtracking events.

Thus, search efficiency improvements are traditionally obtained by writing redundant constraints that contribute to further reduction of the search space, a search strategy based on heuristics which, by exploiting domain knowledge, efficiently chooses variables to instantiate as well as instantiation values, or a combination of the two. However, it is believed that improvement of the traditional methods may be found.

Accordingly, it would be desirable to provide methods and systems to automate exploitation of domain knowledge by letting an EA evolve an appropriate search strategy. More precisely, it would be desirable to provide methods and systems for implementing evolutionary algorithm that produces variable instantiation preferences specifying which variables to instantiate, in which order and to which values. It would further be desirable to provide methods and systems for applying evolved strategies to problems and letting the strategies assign as many variables as possible, with a default completion strategy performing the remaining assignments. It would further be desirable to provide methods and systems for using evolved strategies to perform early cuts of the search space, such that exploration of the uninteresting regions of the search tree is prevented or significantly reduced.

SUMMARY OF THE PRESENT INVENTION

It is an objective of the present invention to provide improved methods and systems for applying evolutionary algorithms to many types of problems that may be modeled using decision variables, including MP, CP, MIP, planning, scheduling, and other problems.

It is further an objective of the present invention to provide improved methods and systems by which an evolutionary algorithm may be applied to a model containing a set of decision variables, a set of constraints, and relatively few additional parameters defined by the entity constructing the model.

It is further an objective of the present invention to provide improved methods and systems by which an evolutionary algorithm may be applied to a model containing a set of decision variables, a set of constraints, an objective function, and relatively few additional parameters defined by the entity constructing the model.

It is further an objective of the present invention to provide improved methods and systems for handling feasibility problems encountered within application of an evolutionary algorithm without modification of a problem model.

It is further an objective of the present invention to provide improved methods and systems for indirectly representing potential partial or complete solutions to models as variable instantiation instruction sets within a population which may be evolved.

It is further an objective of the present invention to provide improved methods and systems for decoding indirect solution representations into partial or complete solutions to models.

It is further an objective of the present invention to provide improved methods and systems for evolving one or more indirect solution representations to create new potential solutions or indirect solution representations.

It is further an objective of the present invention to provide improved methods and systems for generating solutions to difficult models.

These and other objectives of the present invention are accomplished by providing systems and methods for generating robust search strategies.

The present invention generally encompasses a software program operating on a computer including a general purpose microprocessor that implements one or more algorithms for finding or improving solutions to optimization problems.

In one embodiment of the invention a potential assignment of values to decision variables in a problem may be represented as one or more sets of parameters related to decision variables, potential values, and priorities.

In another embodiment of the invention potential assignments of values to variables may be generated by selecting sets representing decision variables, potential values, and processing priorities.

In another embodiment of the invention, a potential solution to a problem may be generated by selecting a potential value for and a decision variable from a group of sets of potential values, decision variables, and priorities, attempting to assign the value to the variable, testing the feasibility of the attempted assignment, and repeating the process a plurality of times.

In another embodiment of the invention groups of sets of potential values, variables, and priorities may be compared by determining a measure of potential variable assignment completeness for each group and comparing the measures or by determining a bound upon an objective function for each group and comparing the bounds.

In another embodiment, sets of assignment priorities are used to generate partial solutions to problems; the sets may be compared by determining a bound upon an objective function for each set or determining a maximum partial assignment made possible by each set.

These and additional embodiments of the invention will be further described herein.

DETAILED DESCRIPTION OF THE INVENTION

Figure 1:
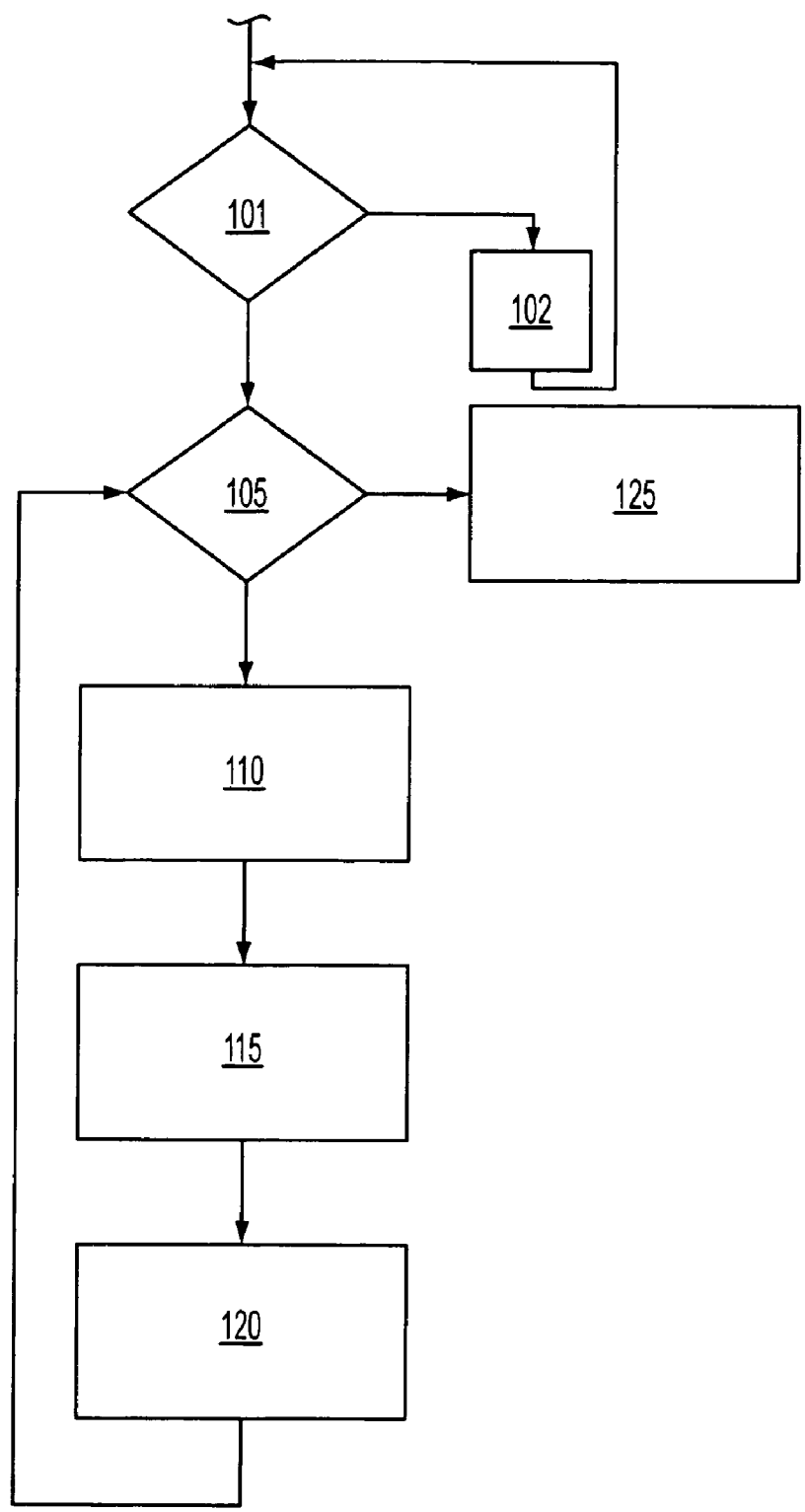
FIG. 1 shows a flow chart illustrating the steps that may be performed by a basic evolutionary algorithm.

The present invention may be applied to problems that can be represented using a set of decision variables $N_v$ and a set of constraints and possibly an objective function, including CP and MIP problems. The present invention does not require definition of an objective function, but may be applied to problems with objective functions. Such problems are often solvable by assigning a value to each of the decision variables such that no constraint is violated, resulting in a feasible complete solution to the problem. Where one or more constraints are violated by the value assignments, the solution is considered to be infeasible. Further, in some instances, problems are formulated such that it is very difficult to find a feasible complete solution.

When an objective function is included in the description of the problem, a preferred goal is to go beyond merely finding a feasible complete solution, but to find an optimal or improved solution, defined by the objective value of a given solution.

The present invention allows for assignment of values to a portion of $N_v$, such that the assigned portion of $N_v$ appears feasible. That is, as each variable in the partial assignment is assigned a value, the value may be propagated throughout the set of constraints. In this manner, it is possible to determine whether the assignment results in some unfeasibility before moving to the next assignment.

For example, consider a simple problem having variables x1, x2, and x3 and constraints x1+x2=3 and x2−x3+3x1=5. The value 1 may be assigned to x1. This assignment may be propagated to the two constraints resulting in 1+x2=3 and x2−x3+3=5. In this example, it is easy to see that x2 must be assigned 2 for the solution to be feasible. Otherwise, the first constraint will be violated. However, if x2 was assigned a value of 3 before the assignment of 1 to x1, the solution will be infeasible, because 1+3=3 is not feasible. In this example, either of the partial solutions (i.e., x1=1 or x2=3) may be feasible, but the combination of the two is infeasible.

In one aspect, the present invention allows for generation of a population of evolvable representations, which are also referred to herein as genomes. In a simple form, the genome represents a collection of variable assignment preferences encoded as "genes." Each gene may be defined as follows. For a set of variables $X^D$ modeled with the same domain D, genes may be of the form:

$$\{x,p,v\} \in \{X \times [1,N_v] \times D\}$$

where:
- x denotes the variable to be assigned which is part of the set X,
- p is the assignment priority of variable x which is in the range 1 to $N_v$, and
- v is the value to which x will be assigned from the domain D.

A given genome may have multiple genes corresponding to a single variable. For example, if the domain of a variable called x1 includes three values, the genome may include up to three genes corresponding to x1, one for each of the possible values. In fact, the genome may contain more than three genes corresponding to x1, but the additional genes will generally be considered redundant and often unused.

This example generally corresponds to problems wherein all variables have the same initial domain. However, it is a relatively simple matter to extend these techniques to variables with different domains by appropriately dividing the genome and applying the techniques described here to each section.

The genome can be divided by the domain of the variables in the genes, such that each group contains genes wherein the variables have the same domain. This allows for a degree of interchangeability between variables. Another technique is to encode preferred variable values (v) in the genome as the index of the value in the assigned variable's domain $D_x$. For example, each v may be assigned an arbitrary integer i, which is mapped to the literal value of v within $D_x$ using the mapping $v=D_x[(i \bmod |D_x|)]$, where $D_x[i]$ returns the i-th value of domain $D_x$. This encoding allows mixing variables with heterogeneous domains in a single genetic representation. Where the values v are encoded in this manner, the decoder should be configured to map the encoded values to the literal values of v during decoding.

It is likely that some or all of the genomes in the population will not include genes corresponding to every variable in $N_v$. While the possibility of generating partial solutions from the genomes may prove problematic for previously used methods for solving problems, the methods of the present invention are able to effectively handle partial solutions to problems.

In certain embodiments of the present invention, the genome may also include a set of related parameters. These parameters may include gene decoding parameters and evolutionary operator parameters. Examples of such parameters may be described as follows. A first parameter named popsize may defined as the size of the population of solutions. Popsize may be given a default value of 30. A second parameter named X may be defined as a set of $N_v$ decision variables. X is generally not assigned a default value, but is specific to the problem being modeled. A third parameter named encodingFraction is defined as the number of genes to be encoded in each genome using the algorithm of the present invention divided by $N_v$. The encodingFraction parameter may be given a default value of 1; that is, the number of genes in each genome may be set equal to $N_v$. This does not imply that a gene for each variable must be present in each genome. A fourth parameter named f is defined as the objective function. In some instances, f might not be assigned a default value. Such instances are often referred to as constraint satisfaction problems (CSPs), and might correspond to an overall goal of locating any feasible solution rather than a goal of seeking an improved objective value. A fifth parameter named completionMethod may be defined as the completion method used to explore the search tree. For example, completionMethod may be defaulted to a first fail algorithm, which corresponds to the algorithm described in connection with FIG. 2.

Figure 2:
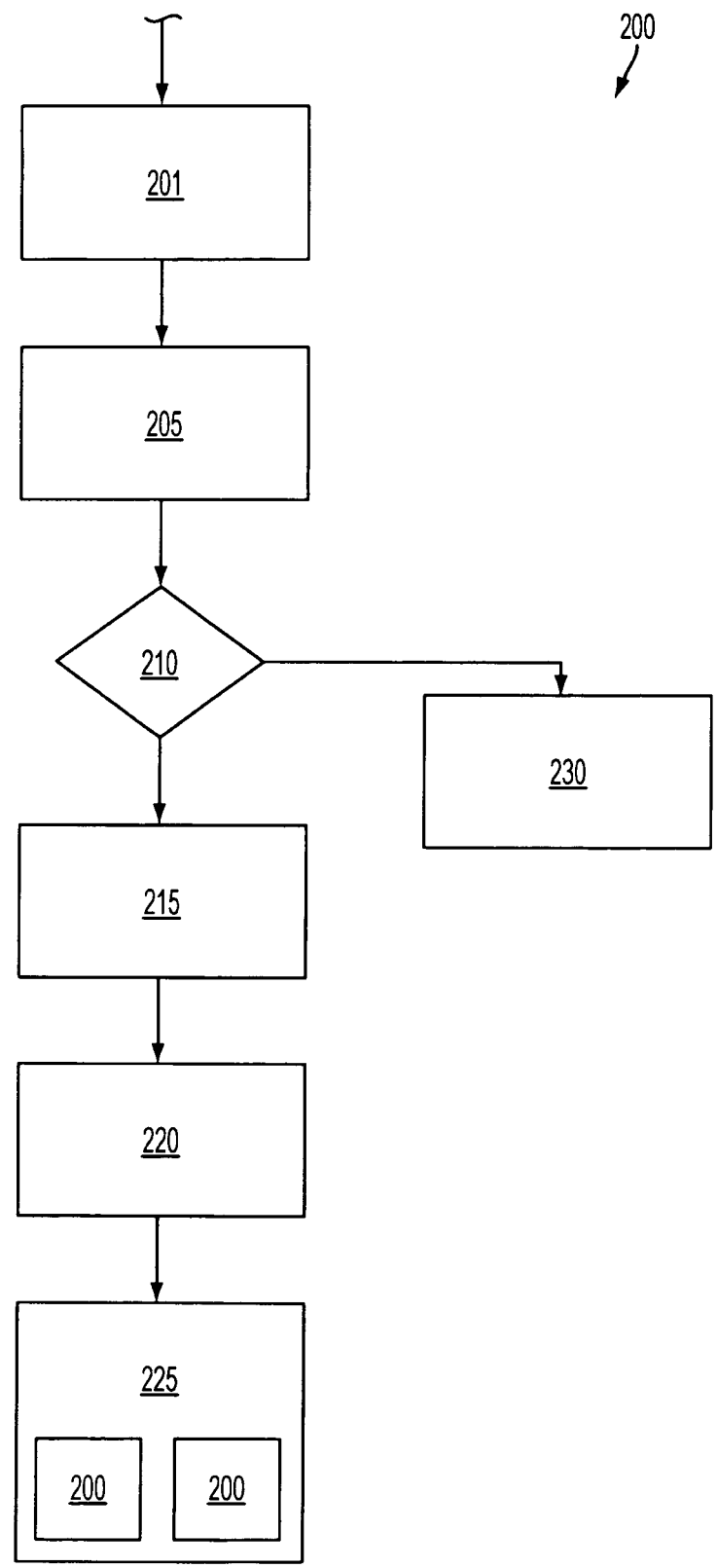
FIG. 2 shows a flow chart illustrating the steps that may be performed by a simple depth first search algorithm.

In the case that first fail is the default completion method, the methods of the present invention may use the algorithm described in connection with FIG. 2 in connection with evolving (a) the set of variables to instantiate, (b) the order in which these variables are instantiated, and (c) instantiation values for each of these variables.

Before a genome may be included in the population, the one or more genes (e.g., variable, assignment priority, and value triplets) belonging to the genome must be encoded. In many cases, it is desirable to limit encoding to a subset of the decision variables required to solve the problem. This limitation allows use of compact genome definitions when given a large number of variables. The parameter encodingFraction may be used to determine the number of encoded variable preferences in a genome by setting the cardinality of the genome equal to the encodingFraction multiplied by $N_v$.

Thus, the encoding of the genome may be incomplete or redundant. When the encoding is incomplete, some variable preferences may be left unspecified. This can be due to a small encoding ratio (e.g., encodingFraction<1), inconsistent preferences, or a small evolved decoding limit. When the encoding is redundant (or conflicting), multiple preferences for the same variable may appear in the genome. That is, more than one gene may appear for a given variable. As it is preferable for genome decoding to use encoded assignment priorities to determine variable instantiation order, the assignment with the highest priority p should be decoded first. The effect of this prioritization is that a redundantly encoded genome will likely contain recessive genes that can nevertheless be processed by genetic operators. As assignment priorities evolve, such genes may become part of a diversity reservoir and may in turn become dominant, thus possibly contributing to further solution improvement.

As mentioned, in addition to variable assignment preferences, the genome of the present invention may also contain encoded parameters controlling genetic operators as well as the genome decoder.

Desirable "encoded parameters" for use with a genome include the following. A first parameter $\mu_\gamma$ may be defined as the mutation probability of the parameters γ within a genome. A second parameter $\gamma_\pi$ may be defined as the probability that the objective will be constrained before the preference genes are decoded. A third parameter $\gamma_\delta$ may be defined as the decoding limit (or the maximum number of genes to be decoded). A fourth parameter $\gamma_\mu$ may be defined as the probability that preferences stored in G will be mutated. A fifth parameter $\gamma_\lambda$ may be defined as the Lamarckian learning probability of assignment preferences. This parameter may be used to determine the value of the set learn as is explained below, in the discussion of the Lamarckian learning operator.

The parameter $\gamma_\pi$ may be used as follows. If the problem contains an objective function, an objective value may be computed after at least one complete feasible solution is found. With a computed objective value, later searches for solutions are generally only concerned with finding a solution that will equal or improve upon the best found objective value. When using the parameter, later searches will attempt to improve upon the best found objective value with probability γπ. The later searches will attempt to match or improve upon the objective function with probability 1-$\gamma_\pi$. Preferably, if the strict improvement goal is required, the best found objective value will be incremented by 1. Thus, a best found minimization objective value of 50 could only be surpassed by an objective value of 49 if a strict improvement goal was required. This constraint upon the objective value renders the problem non-stationary. Thus, decoding of the same genome with a constrained objective might yield different assignments than decoding of the same genome without a constrained objective.

Though parameters may be stored, hard-coded, user defined, or chosen otherwise, it is preferable to choose the values of the parameters in a genome randomly. Further, though parameters could be encoded as a floating point value or a non-integer value, it is preferable to encode parameters as integers to reduce complexity in the genomes. However, many of the parameters that are desirable to include in a genome represent probabilities, which are generally fractional values between 0 and 1. To allow for such probabilities to be represented as integers, a parameter encoding and decoding scheme may be used. Such a scheme allows representation of fractional values using integers.

In the preferred scheme, $\gamma_\delta$ is encoded as a value $Z \in [1, |G|]$. The decoding scheme assigns $\gamma_\delta = z$. In the preferred scheme, $\gamma_\mu$ and $\mu_\gamma$ are each encoded as a value $z \in [1 \ldots \log|G|]$. The decoding scheme assigns $\gamma_\mu$ and $\mu_\gamma$ each a value $e^z/|G|$. In the preferred scheme, $\gamma_\pi$ and $\gamma_\lambda$ are each encoded as a value $z \in [1 \ldots \log|G|]$. The decoding scheme assigns $\gamma_\pi$ and $\gamma_\lambda$ each a value $z/\log|G|$. When a parameter is mutated, any value within the relevant set may be selected to replace the old parameter value.

The preferred method of encoding within the present invention is random creation of genes which are used to populate a genome. To encode a gene, a variable $x \in X$ is chosen. Preferably, variable x for each encoded gene will chosen randomly from X, but other selection methods may be used. It is further preferable that after selection of the variable, a value $v \in D_x$ is randomly chosen for the gene. Again, it will be understood that other selection methods may be used. An assignment priority is also chosen, preferably randomly. However, the assignment priority may be assigned in another fashion (e.g., sequential priorities or all priorities set equally). The {x,p,v} triplet is then placed in the genome. The process should be repeated until the genome contains the desired number of genes.

The encoded genomes described above can be considered to be indirect representations of one or more solutions. Thus, any encoded genome in the population may later be decoded in an attempt to find a partial or complete solution to the problem.

Figure 3:
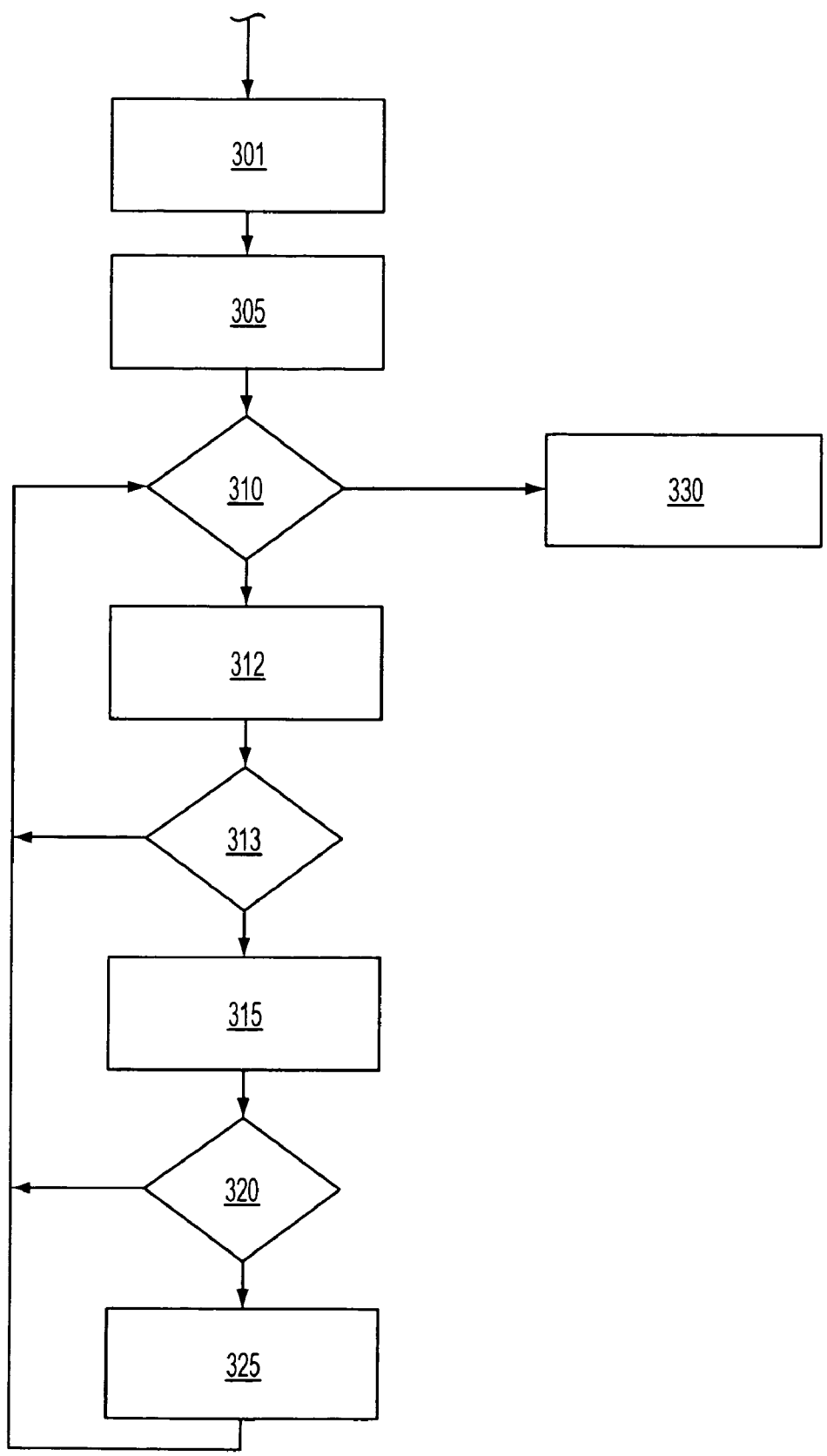
FIG. 3 shows a flow chart illustrating the steps that may be performed in an exemplary decoding process.

Referring now to FIG. 3, an exemplary method of the decoding process proceeds as follows. In step 301, a genome from the population is provided to a decoder. The decoder may be provided with a decoding limit and a search strategy for propagating variable assignments through constraints. In step 305, The decoder creates a candidate list containing all genes from the genome that correspond to unbound variables (i.e., the cardinality of each variable's domain is greater than one). (Of course bound variables can only be assigned a single value making further testing of that value unnecessary.) In step 310, the decoder determines whether the candidate list is empty. If the candidate list is empty, decoding is complete and the flow proceeds to step 330, where decoding ends. If the candidate list contains at least one gene, the flow proceeds to step 312. In step 312, the decoder selects the gene with the highest assignment priority and removes the gene from the candidate list. If two or more genes have equal priority, the decoder will select (e.g., randomly) one of the genes to remove. Flow proceeds to step 313, where the decoder determines whether the gene corresponds to a variable that has not been assigned a value. Because a genome may contain multiple triplets related to a single variable, if the gene corresponds to a variable that has already been assigned a value, flow returns to step 310. However, if the gene corresponds to a variable that has not yet been assigned a value, flow proceeds to step 315, wherein the decoder temporarily assigns x=v before proceeding to step 320. In step 320, the decoder tests the feasibility of the assignment x=v. For example, the feasibility may be tested by using a search strategy to propagate the assignment through the problem's constraints.

It will be recognized that propagation of an assignment through the constraints may result in the binding of other variables. For example, in a problem with the constraint x1+3×2=9, x2 may be assigned the value 2. In this example, if the feasibility test showed that the assignment x2=2 was feasible, x1 would then be required to take the value 3 to satisfy the constraint. Accordingly, x1 could be assigned 3 and the assignment x1=3 could be tested for feasibility before returning to the flow illustrated in FIG. 3. In problems with multiple constraints, many such variables might be bound before returning to the illustrated flow. For example, if the example problem contained an additional constraint x1−x7=1, the assignment of a value to x1 would then bind variable x7. In certain problems, it will be possible that all variables might be bound during this propagation. Where all variables are bound during propagation, it will be unnecessary to continue the decoding process.

Returning now to the flow of FIG. 3, if step 320 determines that the assignment is feasible, flow returns to step 310. If the assignment is infeasible, flow proceeds to step 325, where the assignment is removed. Flow then returns from step 325 to step 310. As noted, the decoding cannot continue when the candidate list is empty. Decoding may also be stopped in other manners.

For example, if a decoding limit is provided (e.g., a time limit or a limit on the number of variables to instantiate), the decoder may be proceed to step 330 when the limit is reached. In the alternative, decoding may stop if all decision variables have been assigned a value. Neither alternative is illustrated in FIG. 3, but both will be recognized as simple modifications of the decoder. After decoding is complete, if values have not been assigned to each decision variable, it is often preferable to pass control to a completion search strategy, for example, the strategy described in connection with FIG. 2.

A similar example of a decoder may be represented in pseudo-code as follows:

```
Require: G {a genome containing at least one [x, p,
  v] triplet}
Require: X {the array of decision variables}
Require: L {a decoding limit}
Require: D' {The solver's variable domain map}
  E <- [g = {x, p, v} ∈ G where |D'_x|>1} {The set of
    unbound variables}
  counter <- 0
  While counter < L and |E| > 0
    remove the gene {x, p, v} with the highest
      remaining value of p from E
    increment counter
    assign x = v
    search (x = v) for feasibility
    if (x = v) is not feasible
      assign x ≠ v
    end if
  end while
```

Applying decoding now to a simple example without a decoding limit, assume a set of decision variables X={x1, x2, x3, x4}. Further assume that a genome G with three genes {x1, 7, 3}, {x1, 4, 12}, and {x3, 6, 34} has been encoded. Decoding of this genome may be handled by a decoder in the following manner. First, the gene with the highest priority is removed from G. Because 7 is the highest priority, the gene {x1, 7, 3} is removed from G. A temporary assignment x1=3 is made. The assignment x1=3 is tested for feasibility. If the assignment is not feasible, the temporary assignment is removed and x1 remains unassigned. Next, because 6 is the second highest priority, the gene {x3, 6, 34} is removed from G. A temporary assignment x3=34 is made. The assignment x3=34 is tested for feasibility. If the assignment is not feasible, the temporary assignment is removed and x3 remains unassigned. Next, the final remaining gene {x1, 4, 12} is removed from G. If x1 has already been assigned a value, then this final gene is ignored. Otherwise, a temporary assignment x1=12 is made. The assignment x1=12 is tested for feasibility. If the assignment is not feasible, the temporary assignment is removed and x1 remains unassigned. At this point, the genome has been exhausted with no assignment for x2 or x4. So, regardless of whether assignments for x1 and x3 were feasible, it will be desirable to invoke a completion search strategy to attempt to assign values to the remaining unassigned variables.

The decoding strategy of the previous example may be described in pseudo-code as:

```
Retrieve NextGene <- (x1, 7, 3)
If x1 = 3 is feasible
    Assign x1 <- 3
    Retrieve NextGene <- (x3, 6, 34)
    If x3 = 34 is feasible
        Assign x3 <- 34
    End if
Else
    Retrieve NextGene <- (x3, 6, 34)
    If x3 = 34 is feasible
        Assign x3 <- 34
        Retrieve NextGene <- (x1, 4, 12)
        If x1 = 12 is feasible
            Assign x1 <- 12
        End if
    Else
        Retrieve NextGene <- (x1, 4, 12)
        If x1 = 12 is feasible
            Assign x1 <- 12
        End if
    End if
End if
```

From this pseudo-code, it can easily be seen that the gene (x1, 4, 12) is ignored if the assignment x1=3, from the gene (x1, 7, 3) is feasible. Thus, inclusion in a genome of multiple genes related to a single variable will not cause assignment problems, and may lead to increased genetic diversity when a genome with such genes is evolved.

One important detail is that is often unknown before decoding is the number of genes that should be decoded in order to build a solution. Indeed, if too many genes are decoded, the decoded solutions may systematically lead to invalid states. On the contrary, if too few genes are decoded, an insufficient number of decision variables may be set which may prevent the completion search strategy from finding a complete solution. This problem may be solved by encoding a decoding limit in the genome and using the EA to evolve the decoding limit to meet the tendencies of the specific problem. It is preferable to evolve the decoding limit randomly based on the fitness of the genome. Thus, the decoding limit will generally be assigned a random value from the set [1,|G|]. Non-random or less-random evolution of the decoding limit is also possible.

Use of the decoder in the foregoing manner will never result in infeasible partial solutions. However, when a completion search strategy (such as DFS) is invoked, the strategy may never be able to produce a complete solution. As a consequence, the EA may not even be able to generate an initial population of complete solutions. To overcome this potential problem, the completion search strategy may be invoked with a finite fail limit permitting the capture of partial assignments reached during search. This may be done by retaining the solver state for which, in the method corresponding to FIG. 2, the number of unbound variables is smallest. If the fail limit is reached and no complete solution has been produced, the captured partial assignment may be added to the population of solutions.

When determining whether to add a partial solution to a finite population of solutions, it is often desirable to determine which of a set of solutions is fitter or more desirable than the other member(s) of the set. Where no complete solution to a problem is found using the above techniques, the problem may be considered difficult. For difficult problems, partial solutions may be compared to other partial solutions by considering completeness. That is, the percentage of decision variables that are bound in each partial solution may be compared. An alternative method of evaluating partial solutions may be used in problems with an objective function. In such problems, each partial solution may be used to compute a bound on the objective function. For solutions of equal completeness, these bounds may be compared to determine relative fitness of the partial solutions.

Where all decoded solutions using the above techniques are complete solutions, the problem may be considered not difficult. In such problems, the objective function value for each solution may be computed and used as a measure of solution fitness.

It is believed that using completeness as a measure of fitness has advantages over previously practiced measures of fitness that measure the number of constraints violated, the number of variables violating constraints, or some combination of the two. Such methods may require complicated or problematic evaluation of the severity of constraint violations. For example, a sum over all violated constraints of the number of variables that must change to satisfy the constraints might over-estimate the number of variables which must have different values to satisfy all constraints, because a change to a single variable may result in satisfaction of many constraints. Likewise, checking the maximum number of variables violated by any constraint will likely result in an under-estimate of the number of variables that must have different values.

Thus, the present invention provides a relatively simple measure of fitness which may be accomplished by measuring completeness of partial solutions. Likewise, the partial solutions of the present invention all for better application of CP, which may use many different constraint propagation methods in attempting to find a complete solution.

In yet another aspect of the present invention, it may be desirable to change the population of genomes by applying an evolutionary algorithm to the population. One preferable manner of applying an evolutionary algorithm to the population requires generating a measure by which genomes can be compared against one another. This is desirable where the size of a population of genomes is limited. In such instances, the population of genomes has reached the limit, it will not be possible to add a genome to the population without eliminating a genome within the population. Generally, it is considered undesirable to eliminate a very fit genome to provide space in the population for a weaker genome.

The following example provides exemplary methods for measuring the fitness of a genome. First, a genome is decoded into a partial or complete solution, with or without a decoding limit. If the solution is incomplete, it is preferable to employ a completion search strategy (for example, DFS) to search for a complete solution. Generally, the completion search strategy will be limited to some finite number of failures or a finite search time. During execution of the completion search strategy, it is desirable to retain the most complete solution that is reached.

For example, the completion search strategy may reach a state where 90% of the variables are assigned a value before being required to backtrack to a state where only 75% of the variables are assigned. The completion search strategy may never reach a state wherein 90% of the variables are assigned before reaching a designated finite number of failures or finite search time limit. In such a circumstance, it is often desirable to retain the 90% assignment state as the most complete solution that has been generated by the genome.

If this process yields only a partial solution to the problem and the problem has an objective function, the partial solution may be used to generate a bound on the objective function. Also, whether or not an objective function has been defined, the percentage of variables assigned a value in the most complete partial solution may be retained. Either (a) the bound on the objective function, (b) the percentage of variables assigned a value in the most complete partial solution, or (c) both may be related to the genome and stored in connection with the genome. These values may be used to compare the fitness of the genome to other genomes. As mentioned, this comparison of fitness may be useful during evolution of genomes.

Due to the composite aspect of the genetic representation described herein, which may contain parameters and variable assignment information, it is preferable that the genetic operators process these components in the following order: (1) the $\mu_\gamma$ parameter, (2) parameters which can be mutated with probability $\mu_\gamma$, and (3) encoded variable assignments G.

Preferably, the evolutionary algorithm will be endowed with three different genetic operators. Although two of them (crossover and mutation) are known in the art, the third one is an original Lamarckian learning operator.

A number of genetic operators are known in the art to be useful. One such operator is uniform mutation. Uniform mutation is generally applied by selecting a single individual from a population, applying a mutation probability $\mu$ to each component of the individual, and mutating each component with probability $\mu$. Many variations of this general method exist. For example, each component could be mutated with probability $\mu_{component}$ specific to each component.

When mutation is applied to a genome of the present invention, any component within a genome may be mutated. Where the genome comprises parameters in addition to genes, the parameters may each be mutated with a probability $\mu_\gamma$. The $\mu_\gamma$ parameter may itself be mutated with the probability 1 divided by the genome size. It is preferable to mutate the parameters prior to mutation of the genes. Each gene may be mutated with a probability $\gamma_\mu$. For each gene, any part of the {x, p, v} triplet may be mutated. The variable x may be mutated, preferably to a variable with same initial domain. The value v may be mutated, preferably within the domain $D_x$. The assignment priority p may be mutated, preferably to a value within the set [1, |G|]. It is possible that more than one part of any triplet will be mutated.

Another genetic operator is uniform crossover. (Many other types of crossover, including one point crossover, two point crossover, "cut and splice," and half uniform crossover are known in the art.) Uniform crossover generally involves selecting two parents from a population and swapping some percentage of the components of each parent with the other parent. Often fifty percent of the components are swapped. This method results in two offspring. Uniform crossover may also be applied in the following manner. Given an exchange probability p and two parents A and B, uniform crossover may produce an offspring inheriting its genes from parent A with probability p and from B with probability 1−p. Using a random exchange probability, it is preferable to apply this operator to create each component of the offspring genome: $\mu_\gamma$, $\gamma$ parameters as well as assignment preferences G. Uniform crossover may be further altered where the components in the parents are not ordered components, e.g., in the genomes described above. In such situations, each of the components from the two parents may be added to a component pool and selected for inclusion in an offspring genome with some probability.

Consider an example wherein 100 genes have been encoded in each genome, and the selection probability is 0.5. All 200 genes may be placed in a pool of genes. Then, each gene may be independently considered for inclusion in an offspring genome with probability 0.5 until 100 genes have been selected for inclusion in the offspring. This may result in an offspring with any number of genes between 0 and 100 from a particular parent. That is, it may result in an offspring without any genes from one parent and every gene from the other parent.

A third genetic operator, also an aspect of the present invention, is called the Lamarckian learning operator. The Lamarckian learning operator operates on two parent genomes. If operator and decoding parameters are encoded in the genome, Lamarckian evolution processes the parameters in the same manner as uniform crossover. The operator considers the decoded assignments related to the two parents and re-encodes a portion of the decoded assignment into the offspring's genome. Thus, variable assignments discovered during the decoding process (including the completion search and constraint propagation) may be included in the genetic representation as assignment preference triplets.

Genetically modified offspring may be produced using the Lamarckian operator by performing uniform crossover with a random exchange probability on $\mu_\gamma$ and $\gamma$ parameters. Learned assignment preferences that reflect common features found in both parents may then be produced.

The learned assignment preferences may be produced by collecting: 1) the set of learned variables which is the union of the similarly assigned variables in both decoded assignments (called same), 2) the set of variables which are unbound in both decoded assignments (called unbound), and 3) the remaining set of variables which have different values or different binding status between the two decoded assignments (called different).

It is preferable that the Lamarckian operator process the gene assignments using a software loop. The loop iterates once for each gene to be encoded, preferably a number based on encodingFraction. Prior to entering the loop, a counter learn is assigned a number equal to the cardinality of a random subset of elements selected from unbound $\cup$ same with probability $\gamma_\lambda$. Within each iteration of the loop, if learn>0, learn is decremented, and a variable is randomly chosen from either unbound or same, preferably with a probability inversely proportional to the size of the chosen variable set, as long as one or both sets contain variables. The chosen variable is encoded in a gene. If the variable was chosen from same, it is encoded with the value found in the decoded assignment. If the variable was chosen from unbound, it is encoded with a random value from $D_x$. If learn=0, then a second test on different is performed. If different is not empty, then a random variable is removed from different and encoded in a gene. If the decoded solutions for the two parents contain different assigned values for the variable, then one of the two values is chosen, preferably randomly, and assigned to the gene. If the decoded solution for only one parent contains an assigned value for the variable, that value is chosen and assigned to the gene. Finally, if the above iterative loop does not yield a complete genome before exhausting unbound, same, and different, variables may be randomly chosen from X and encoded in genes. This may occur if encodingFraction>1. These genes may be assigned a random value from $D_x$. Each gene processed by the Lamarckian operator may be assigned a random assignment priority from the set $[1, N_v]$.

It is preferable to randomly select the variables to encode from either unbound or same with a probability which inversely proportional to its cardinality. This prevents the operator from systematically encoding large feature sets of the same kind. This is especially useful when only a couple of variables remain unbound in the parent assignments and when a comparatively large same set exists. This situation arises when the EA population converges. At this point, the population contains many similar genome, and the Lamarckian operator, by re-encoding random values as preferences for these unbound variables, will explore new assignments (as well as new assignment priorities) for the remaining (and likely problematic) variables.

When the methods of the present invention are applied to solve both constraint satisfaction problems (CSP) and constrained optimization problems (COP), the EA should behave somewhat differently for each of these cases because solution comparison criteria differ. Solution completion may be used as a fitness measure of constraint satisfaction problem solutions, and by extension a fitness measure of the genome from which the solution originated. However, it is desirable to use Pareto comparison if given the completion and objective value of solutions, i.e. in COPs. Nevertheless, EAs applied to both types of problems generally share the following features: they produce one individual per generation (they are "steady-state"), parents are generally selected randomly, and identically decoded genomes are avoided.

In the preferred evolutionary algorithm for CSPs, offspring genomes are rejected when decoded into worse (less complete) solutions than the worst (least complete) solution associated with another genome existing in the population. It is preferred that accepted offspring may replace the worst parent; ties may be broken by choosing the parent most similar to the offspring. In the alternative, the accepted offspring may replace the genome having the worst solution association.

An exemplary EA for CSPs may be represented by the following pseudo-code:

```
Require: a set of genetic operators O
Assign population <− 0
while stop criterion not met do
    if |population| < popsize then
        add a random genome to the population
    else
        randomly choose an operator from O
        invoke operator to create offspring
        if offspring meets selection criteria
            add offspring to population, replacing an
            individual in the population
        end if
    end if
end while
```

First, this pseudo-code requires the existence of at least one genetic operator. In this example, the genetic operators may be uniform mutation, uniform crossover, the Lamarckian operator or other evolutionary methods. The pseudo-code empties the population pool. Then, the pseudo-code performs a loop until a stopping criterion is met. The stopping criterion may be, for example, a time limit. Within the loop, if the population size has not reached its limit (defined by variable popsize), then a genome may be encoded and added to the population pool. However, if the population size has reached its limit, an evolutionary method is applied. This will generate at least one offspring. The offspring is tested against its parents or other genomes in the pool, and if found to be more fit, the offspring is added to the pool to replace either a parent or one of the other genomes in the pool.

Figure 4:
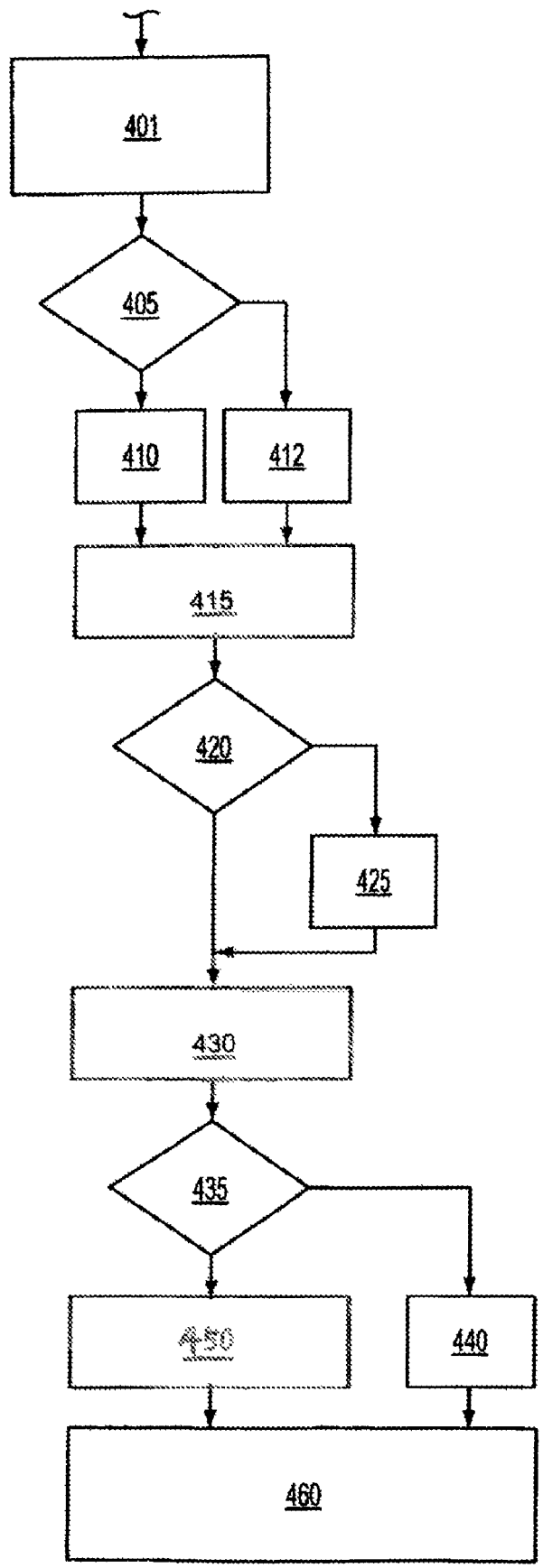
FIG. 4 shows a flow chart illustrating the steps that may be performed in an exemplary evolutionary algorithm for a constraint satisfaction problem.

Another exemplary EA for a CSP will be described in conjunction with FIG. 4. In step 401, a population of genomes is provided. Preferably, a full population (defined by a population size limit) of genomes will be provided in step 401 and each genome will be associated with at least one of the fitness measures described above. Though, it is possible that other fitness measures may be appropriate for specific problems or classes of problems. In step 405, an evolutionary method is selected. In this example, mutation, cross-over, or Lamarckian learning is selected. The evolutionary method may be selected randomly or in other fashions. If mutation is selected in step 405, the flow proceeds to step 410, where a single genome is randomly selected from the population and mutated into an offspring according to a mutation method. Flow proceeds to step 415, where an attempt to decode the offspring is made. This attempt may use, for example, the decoding method set forth in connection with FIG. 3. In step 420, the decoded solution is tested for completeness. If the solution is incomplete, flow will proceed to step 425, where a completion search strategy is applied. Flow then proceeds from step 425 to step 430. If step 420 detects that the decoded solution is complete, flow may proceed directly to step 430. In step 430, the fitness of the offspring is compared to the fitness of one or more other genomes in the population. Preferably, the offspring's fitness is compared to its parent's fitness. Flow proceeds to step 435. If the offspring's fitness is worse than its parent's fitness, step 435 directs the flow to step 440. In step 440, the offspring is rejected. If the offspring's fitness is equal to or better than its parent's fitness, step 435 directs the flow to step 450. In step 450, the offspring will replace the parent in the population. (It will be recognized that the offspring could replace another less fit solution in the population, rather than its parent.)

If crossover or Lamarckian learning is selected in step 405, the flow proceeds to step 412, where two genomes are randomly selected from the population and used to create an offspring according to a the selected operator. It will be recognized that some crossover methods result in two offspring. In this case, the flow from step 412 forward may be applied separately to each offspring or one offspring may be rejected before proceeding. Flow proceeds to step 415, where an attempt to decode the offspring is made. This attempt may use, for example, the decoding method set forth in connection with FIG. 3. In step 420, the decoded solution is tested for completeness. If the solution is incomplete, flow will proceed to step 425, where a completion search strategy is applied. Flow then proceeds from step 425 to step 430. If step 420 detects that the decoded solution is complete, flow may proceed directly to step 430. In step 430, the fitness of the offspring is compared to the fitness of one or more other genomes in the population. Preferably, the offspring's fitness is compared to its worst parent's fitness. If the offspring's fitness is worse than the worst parent's fitness, step 435 directs the flow to step 440. In step 440, the offspring is rejected. If the offspring's fitness is equal to or better than its worst parent's fitness, step 435 directs the flow to step 450. In step 450, the offspring will replace its worst parent in the population. (It will be recognized that the offspring could replace another less fit solution in the population, rather than its worst parent.) If both parent's have equal fitness measures, then it is desirable to use the offspring to replace its most similar parent. Flow from steps 440 and 450 proceeds to step 460, where the EA is complete. Upon reaching step 460, the EA may be re-iterated by returning to step 401. This may take place any number of times as determined by the circumstances of the problem.

Referring now to the similarity measure referenced with respect to step 450b, preferably, similarity between offspring and parents is measured based on differences between stored variable domains. For an exact comparison, we could represent domains as bit vectors where bit i is set when value vi is member of the domain. Then, to compare two domains, we could simply measure the bit vector Hamming distance: the number of bits of same index that bear different values in the two bit vectors. For Hamming distance on each variable domain would be very expensive, we approximate it by using a multidimensional Manhattan distance on stored variable domain boundaries. For two solutions A and B, the distance function is:

$$d(A, B) = \sum_{x}^{x} |minA(x) - minB(x)| + |maxA(x) - maxB(x)|$$

where S(x) represents the domain of the x variable as stored in the solution S. A parent P is replaced by its offspring P such that it minimizes d(O, P).

In the preferred evolutionary algorithm for COPs, offspring genomes are rejected when unless the offspring pareto dominates the objective value and completeness of at least one of its parents (as decoded). That is, the offspring must improve at least one criterion (i.e., objective value or completeness) and the other criterion must be no worse than the parent. It is preferred that accepted offspring may replace the worst parent; ties may be broken by choosing the parent most similar to the offspring. In the alternative, the accepted offspring may replace the genome having the worst solution association.

An exemplary EA for COPs may be represented by the following pseudo-code:

```
Require: a set of genetic operator O
archive <- 0
population <- 0
while stop criterion not met do
    if archive = 0 ∧ |population| < popsize then
        add a random genome in population
    else
        if |population| = popsize then
            merge population into archive
            population <- 0
        end if
        randomly choose an operator from O
        invoke operator with parents from archive
        add offspring to population
    end if
end while
```

First, this pseudo-code requires the existence of at least one genetic operator. In this example, the genetic operators may be uniform mutation, uniform crossover, the Lamarckian operator or other evolutionary methods. The pseudo-code empties the population pool and an archive pool. Then, the pseudo-code performs a loop until a stopping criterion is met. The stopping criterion may be, for example, a time limit.

Within the loop, if the population size has not reached its limit (defined by variable popsize) and the archive is empty, then a genome may be encoded (preferably randomly) and added to the population pool. Otherwise, an alternative action is taken. Within this alternative action, if the population size has reached its limit, the population pool is merged into the archive pool and the population is emptied. Then, within the alternative action, regardless of whether the population size had reached its limit, an evolutionary method is applied, preferably taking advantage of parent solutions residing in the archive pool. This will generate at least one offspring which is added to the population.

The preferred merge procedure is a variation of the NSGAII algorithm described in an article titled "A Fast Elitist Non-Dominated Sorting Genetic Algorithm for Multi-Objective Optimization: NSGAII" by Deb et al. Generally, this algorithm creates a temporary population comprising the members of the population pool and the archive pool. It then builds an ordering of all of the pareto fronts of the members in the temporary population, using for example, completion percentage and objective value. Half of the temporary population is retained in the archive pool based on the pareto comparison, thereby replacing the previous members of the archive pool. Then, the population pool is emptied.

Preferably, this merge procedure will keep some genomes that decode into incomplete assignments with good bounds on the objective value while also keeping some genomes that decode into complete assignments that may not have as good of an objective value. This blend of preference for completeness and objective value often enables the EA to converge towards complete solutions with good objective values.

While preferred illustrative embodiments of the invention are described above, it will be apparent to one skilled in the art that various changes and modifications may be made therein without departing from the invention. The appended claims are intended to cover all such changes and modifications that fall within the true spirit and scope of the invention.

What is claimed is:

1. A method implemented using a computer hardware device, the method comprising:
    selecting, using the computer hardware device, a value corresponding to a decision variable having a domain of potential values from a set of values corresponding to a set of decision variables in a problem,
    selecting, using the computer hardware device, an assignment value for the decision variable from a set of values corresponding to the selected variable's domain of potential values,
    selecting, using the computer hardware device, a preferred processing priority from a plurality of values, and
    defining, using the computer hardware device, a potential assignment of the selected assignment value to the selected value corresponding to the decision variable, wherein the potential assignment comprises
        a representation of the selected value corresponding to the decision variable,
        a representation of the selected assignment value, and
        a representation of the selected preferred processing priority,
    the representation of the selected assignment value comprises an integer corresponding to the selected assignment value;
    wherein a genome represents a collection of variable assignment preferences encoded as genes, each gene being defined as follows:
    for a set of variables $X^D$ modeled with the same domain D, genes are of the form:
    $$\{x,p,v\} \in \{X \times [1,N_v] \times D\}$$
    where:
        x denotes the variable to be assigned which is part of the set X,
        p is the assignment priority of variable x which is in the range 1 to $N_v$, and
        v is the value to which x will be assigned from the domain D.

2. The method of claim 1, further comprising:
    repeating the steps of claim 1 a plurality of times to define a plurality of potential assignments.

3. The method of claim 1, wherein the representation of the selected value corresponding to a decision variable comprises an integer corresponding to the decision variable.

4. The method of claim 1, wherein the representation of the selected preferred processing priority comprises an integer corresponding to the selected preferred processing priority.

5. The method of claim 1, wherein the value corresponding to a decision variable is selected randomly from the set of values corresponding to the set of decision variables.

6. The method of claim 1, wherein the assignment value is selected randomly from the set of values corresponding to the domain.

7. The method of claim 1, wherein the preferred processing priority is selected randomly from the plurality of values.

8. A method implemented using a computer hardware device, the method attempting to solve a problem having a plurality of decision variables and a plurality of constraints on the value that each of the plurality of decision variables may take, the method comprising:
    selecting, using the computer hardware device, a decision variable and a potential value for the decision variable using a set of parameters, wherein
        the set of parameters is determined by comparing representations of preferred processing priority within a plurality of eligible sets of parameters, and
        each eligible set of parameters comprises
            a representation of the decision variable,
            a representation of the potential value, and
            a representation of the preferred processing priority;
    testing, using the computer hardware device, whether the selected potential value violates any of a plurality of constraints on the values that the selected decision variable may take;
    assigning, using the computer hardware device, the selected potential value to the selected decision variable if the selected potential value does not violate any of the plurality of constraints on the values that the selected decision variable may take;
    removing, using the computer hardware device, the set of parameters from a plurality of eligible sets of parameters; and
    iterating the steps of selecting, testing, assigning and removing a plurality of times using a unique set of parameters from the plurality of eligible sets of parameters for each iteration.

9. The method of claim 8, wherein the assigning step is skipped if the selected decision variable has an assigned value.

10. The method of claim 8, further comprising:
    if the selected potential value was assigned to the selected decision variable, testing whether the assignment of the selected potential value to the selected decision variable binds the value that one or more unassigned decision variables in the plurality of decision variables may take to a single value based on one or more constraints in the plurality of constraints, and if the value that the one or more unassigned decision variables in the plurality of decision variables may take is bound to a single value, assigning to the one or more unassigned decision variables the values to which each additional decision variable is bound.

11. The method of claim 8, further comprising
executing a completion search strategy to attempt to assign values to unassigned decision variables in the plurality of decision variables.

12. The method of claim 11, further comprising
during execution of the completion search strategy, generating a maximum measured number by taking multiple measurements of the number of variables in the plurality of decision variables that have been assigned a value, and retaining the maximum measured number after execution of the completion search strategy.

13. The method of claim 12, further comprising
comparing the maximum measured number for the plurality of eligible sets of parameters to a second maximum measured number for a second plurality of eligible sets of parameters.

14. The method of claim 13, further comprising
discarding the plurality of eligible sets of parameters if the maximum measured number is less than the second maximum measured number, or discarding the second plurality of eligible sets of parameters if the second maximum measured number is less than the maximum measured number.

15. A method implemented using a computer hardware device, the method comprising
assigning, using the computer hardware device, a first set of values to a first subset of decision variables in a set of decision variables, wherein the assignment is based upon a first set of assignment priorities,
assigning, using the computer hardware device, a second set of values to a second subset of decision variables in a set of decision variables;
during assignment of the first set of values to the first subset of decision variables, measuring a first maximum number of decision variables contained in the first subset of decision variables; and
during assignment of the second set of values to the second subset of decision variables, measuring a second maximum number of decision variables contained in the second subset of decision variables, wherein
the assignment is based upon a second set of assignment priorities,
the first set of assignment priorities and the second set of assignment priorities each comprise a plurality of sets of parameters, and
each set of parameters in the plurality of sets of parameters comprises
a representation of a decision variable,
a representation of a potential value, and
a representation of a preferred processing priority.

16. The method of claim 15, further comprising
comparing the first maximum number to the second maximum number.

17. The method of claim 16, further comprising
discarding the first set of assignment priorities if the first maximum number is less than the second maximum number.

18. The method of claim 16, further comprising
discarding the second set of assignment priorities if the second maximum number is less than the first maximum number.

19. A method implemented using a computer hardware device, the method comprising:
assigning, using the computer hardware device, a first set of values to a first subset of decision variables in a set of decision variables, wherein the assignment is based upon a first set of assignment priorities,
assigning, using the computer hardware device, a second set of values to a second subset of decision variables in a set of decision variables,
computing a first bound upon an objective function using the first set of values assigned to the first subset of decision variables, and
computing a second bound upon an objective function using the second set of values assigned to the second subset of decision variables, wherein
the assignment is based upon a second set of assignment priorities,
the first set of assignment priorities and the second set of assignment priorities each comprise a plurality of sets of parameters, and
each set of parameters in the plurality of sets of parameters comprises
a representation of a decision variable,
a representation of a potential value, and
a representation of a preferred processing priority.

20. The method of claim 19, further comprising
comparing the first bound to the second bound.

21. The method of claim 20, further comprising
discarding the first set of assignment priorities if the first bound is less favorable than the second bound.

22. The method of claim 20, further comprising
discarding the second set of assignment priorities if the second bound is less favorable than the first bound.

23. A method implemented using a computer hardware device, the method comprising
selecting, using the computer hardware device, a parent from a plurality of parents, wherein each parent in the plurality of parents comprises a plurality of sets of representations and each of set of representations in the plurality of sets of representations comprises
a decision variable representation,
a potential assignment value representation, and
a priority representation;
creating, using the computer hardware device, an offspring plurality of sets of representations by mutating a plurality of representations in the selected parent with a probability, wherein
for each representation that is mutated, the value of the mutated representation is modified, and
the probability is applied independently to each mutation;
wherein a genome represents a collection of variable assignment preferences encoded as genes, each gene being defined as follows:
for a set of variables $X^D$ modeled with the same domain D, genes are of the form:

$$\{x,p,v\} \in \{X \times [1, N_v] \times D\}$$

where:
x denotes the variable to be assigned which is part of the set X,
p is the assignment priority of variable x which is in the range 1 to $N_v$, and
v is the value to which x will be assigned from the domain D.

24. The method of claim 23, wherein the probability is 0.5.